(12) United States Patent
Ostendarp et al.

(10) Patent No.: US 8,500,181 B2
(45) Date of Patent: Aug. 6, 2013

(54) VACUUM LIFTING TOOL

(75) Inventors: Heinrich Ostendarp, Haan-Gruiten (DE); Kathrin Weidenfeller, Solingen (DE); Lutz Strehlow, Solingen (DE)

(73) Assignee: Bohle AG, Haan (DE)

( * ) Notice: Subject to any disclaimer, the term of this patent is extended or adjusted under 35 U.S.C. 154(b) by 292 days.

(21) Appl. No.: 12/554,073

(22) Filed: Sep. 4, 2009

(65) Prior Publication Data

US 2010/0066108 A1 Mar. 18, 2010

(30) Foreign Application Priority Data

Sep. 5, 2008 (DE) .......................... 10 2008 045 834

(51) Int. Cl.
*B25J 15/06* (2006.01)
(52) U.S. Cl.
USPC .......................................... 294/187; 294/189
(58) Field of Classification Search
USPC ........................................ 294/64.1, 187, 189
See application file for complete search history.

(56) References Cited

U.S. PATENT DOCUMENTS

| | | | | |
|---|---|---|---|---|
| 1,294,103 | A | * | 2/1919 | Hitchcock ........................ 271/98 |
| 2,815,240 | A | * | 12/1957 | Lytle ............................. 294/189 |
| 3,063,746 | A | * | 11/1962 | Oakes ............................ 294/189 |
| 3,759,560 | A | * | 9/1973 | Yoda et al. ..................... 294/186 |
| 5,190,332 | A | * | 3/1993 | Nagai et al. .................. 294/64.1 |
| 5,375,895 | A | | 12/1994 | Volkert |
| 2002/0113181 | A1 | | 8/2002 | Zou |
| 2004/0251702 | A1 | * | 12/2004 | Ishii ............................. 294/64.1 |

FOREIGN PATENT DOCUMENTS

| | | |
|---|---|---|
| CN | 2634975 Y | 8/2004 |
| CN | 201106617 Y | 8/2008 |
| DE | 9318902.8 | 2/1994 |
| DE | 4205628 C2 | 9/1994 |
| GB | 954315 | 2/1964 |
| WO | 2007123354 | 11/2007 |

OTHER PUBLICATIONS

Notification of the First Office Action, China, Oct. 17, 2011.
European Search report, mailed Mar. 21, 2012.

* cited by examiner

*Primary Examiner* — Saul Rodriguez
*Assistant Examiner* — Gabriela Puig
(74) *Attorney, Agent, or Firm* — Greer, Burns & Crain, Ltd.

(57) ABSTRACT

A suction lifter comprises a suction cup to be placed against a fixing surface and having a deformable suction disc, the suction lifter being designed for forming a hollow space subject to a partial vacuum between the suction disc and the fixing surface, wherein the suction disc is arranged between the suction cup and the fixing surface, wherein the suction cup further has a circumferential cup rim surrounding the hollow space, and wherein a circumferential supporting area of an upper side of the suction disc facing the cup rim is supported against the cup rim under a vacuum condition. The suction cup rim and/or the suction disc rim are provided with projections which under a vacuum condition of the suction lifter and under a shearing force exerted on the suction disc impede a lateral displacement of the suction cup rim with respect to the suction disc rim.

21 Claims, 4 Drawing Sheets

VACUUM LIFTING TOOL

BACKGROUND OF THE INVENTION

The invention relates to a suction lifter intended for the temporary fixing on a substantially smooth, air-impermeable fixing surface, said suction lifter comprising a suction cup to be placed against a fixing surface and having a deformable suction disc, the suction lifter being designed for forming a hollow space under a partial vacuum condition between the suction disc and the fixing surface, wherein the suction disc is arranged between the suction cup and the fixing surface, wherein the suction cup further has a circumferential cup rim surrounding the hollow space, a circumferential supporting area of an upper side of the suction disc facing the cup rim being supported against the cup rim under a vacuum condition.

Suction lifters of this kind are used especially in cases where the suction lifter fixed on the fixing surface is subject to shearing forces substantially acting or acting with at least one component force parallel to the fixing surface. This particularly applies where the suction lifter is mounted on inclined or vertical fixing surfaces and is subject to forces in a direction at least substantially parallel to the fixing surface, for example when objects having vertical fixing surfaces are to be lifted using a suction lifter or when the suction lifter is mounted on a wall area in which it is used as a holding device, for example as a temporary handle for persons. Moreover, suction lifters of this kind are frequently also subject to torsion forces about the longitudinal axis of the suction lifter.

Generally the problem exists that the suction lifter, at a given size of the suction disc, shall provide a holding capacity as high as possible over a holding time as long as possible when shearing forces are applied. Although the holding capacity of a suction lifter can be increased by increasing the suction cup and the suction disc, limits are frequently set in practice, for instance due to the spatial conditions and the resulting limitations on behalf of the fixing surface, due to interruptions of the fixing surface or when the fixing surface with its mainly smooth and air-impermeable surface areas is structured, such as tiled wall areas for instance, with joints between the tiles. Generally it turned out that an increased load capacity can be achieved with an increased hardness of the suction disc, since the suction disc offers a higher resistance when it is subject to shearing forces, and this higher resistance prevents early deformation that would finally lead to a loss of the partial vacuum in the hollow space. On the other hand, the hardness of the suction disc has to be adjusted also to other demands. For instance, the fixing surface on which the suction lifter is to be fixed frequently exhibits a certain roughness or surface irregularities, e.g. also in the case of tiles, so that an excessive hardness of the suction disc would prevent the suction disc from sufficiently conforming to the fixing surface, so that the shearing forces the suction lifter is capable to resist are also limited, since leaks between the suction lifter and the fixing surface cause a loss of vacuum.

SUMMARY OF THE INVENTION

The invention is therefore based on the object of providing a suction lifter capable of receiving higher holding forces and/or capable of receiving a given high holding force over an extended period of time at a given size of the suction disc under the influence of shearing forces.

According to the invention, this object is achieved by a suction lifter as stated in claim 1, in which the rim of the suction cup and/or the rim of the suction disc are provided with means which under a vacuum condition of the suction lifter and under shearing forces exerted on the suction cup prevent a lateral displacement of the rim of the suction cup with respect to the rim of the suction disc, said means on the rim of the suction cup and on the rim of the suction disc preferably being interacting means. It has been noticed that due to the means preventing a lateral displacement of the rim of the cup and the rim of the suction disc the suction lifter is capable of sustaining considerably higher shearing forces over a longer period of time, even if the size of the suction disc and/or the size of the cup rim and the material of the suction disc are the same. On the other hand, the suction discs in conventional suction lifters, when subject to shearing forces, can deform to such an extent that the rim of the suction disc will curl and thus contact the fixing surface and seal the hollow space merely by its outer edge area. The means impeding a displacement of the cup rim and the rim of the suction disc can normally be so designed that the cup rim and the rim of the suction disc mesh with each other and are fixed to each other even under vacuum conditions and with high shearing forces exerted on them. To this end, the cup rim for example can be provided with claw-like projections which when subject to a negative pressure and/or shearing forces are capable of digging into the rubber material of the suction disc, thus producing a form fit. For this latter purpose, corresponding recesses can be provided on the upper side of the suction disc. Alternatively, also the cup rim and the rim of the suction disc which is not under a vacuum condition can be provided with an inner or outer cone or with a shoulder respectively that extends at least over a part of the circumference of the suction lifter, so that the cup rim surrounds the cone of the suction disc rim on the radial outside in a bell-like fashion, with the rim of the suction disc and the rim of the cup being allowed to bear flat against one another while the suction lifter is pressed against the contact surface. The force at which the cup rim is pressed against the rim of the suction disc can substantially remain the same in the radial direction. Preferably, the means preventing a lateral displacement are effective with respect to the part of the suction lifter which is the front part in the direction of the shearing force. Preferably, the means preventing a lateral displacement are designed as a kind of overrun brake acting upon the suction cup, so that the braking means of the suction disc that prevent displacement are radially arranged at the level of or externally of the braking means of the suction disc which interact with these aforementioned braking means, especially with regard to the part of the suction cup which is the front part in the shearing direction.

The means preventing a lateral displacement of the suction disc can generally be arranged and designed for being compressed or subject to a pressure by the corresponding displacement preventing means of the suction cup when shearing forces are applied, the pressure force being preferably transferred via the said means of the suction disc to the suction disc and received by the suction disc preferably in a load-transmitting fashion under compressive loading. The transmission of the pressure load preferably takes place in such a way that the contact pressing force of the suction disc to the fixing surface is increased by this transmission of the pressure load in a section of the suction disc, especially in a section which is situated upstream of and/or radially further outwardly of the coupling area of the said means of the suction disc and the cup rim, in the direction of the shearing force. This section preferably is a region sealing the hollow space between the suction disc and the fixing surface even under no shearing load. The means preventing a lateral displacement as a whole can work as a kind of "overrun brake", preferably on the side of the suction lifter which is the front side in the direction of the shearing force. The coupling position of the means preventing a lateral displacement provided on the suction disc can generally be radially further outwards than the coupling position of the means provided on the suction cup and preventing a lateral displacement by cooperation with the first-mentioned means of the suction disc. Thus the coupling position which is the front position in the direction of the shearing force can even be subject to a shearing load under pressure.

According to a preferred embodiment, the means preventing a lateral displacement are provided in the form of projections of the cup rim and the rim of the suction disc (in the following also referred to as "cup rim projection" and "suction disc projection"). The projections engage one behind the other in the direction of the shearing force and are supported one against the other in the radial direction when a shearing force is applied. The cup rim projection and/or the suction disc projection can be continuous around the full circumference of the respective suction cup and/or suction disc. Here the support projection of the cup rim is arranged radially inwards with respect to the support projection of the suction disc. Under no shearing force or at least when a shearing force is applied, the two projections can bear against each other in a linear fashion or flat with their surfaces, at least over a part or practically over the entire circumferential extension of the suction cup under a vacuum condition of the suction lifter. The contact area can extend up to a certain degree in the radial and/or vertical directions, e.g. over $\geq$1-2 mm or $\geq$3-4 mm.

For the purpose of the present invention, the term "radially inner cup rim part" is to be understood as the cup rim part situated on the radially inner side with respect to the supporting area of the cup rim projection which faces and cooperates with the suction disc projection for preventing a lateral displacement. The term "radially outer cup rim part" is to be understood as the cup rim part situated radially outwards with respect to the supporting area of the cup rim projection facing the suction disc projection.

By the cup rim and the suction disc being designed in accordance with the invention, any excessive deformation and/or curling of the suction disc caused by the influence of shearing force is impeded to a large extent. This provides for a contact surface which is still defined and as large as possible, thus increasing the capability of receiving even higher shearing forces. Looking at pulling experiment in which the suction lifter is subject to increasing shearing forces, especially to shearing forces uniformly increasing over time, one may determine for a suction lifter constructed according to the invention that the maximum holding capacity and particularly the holding time are higher and longer than in a suction lifter not provided with the means according to the invention, even if high shearing forces, e.g. above 800-1,000 N, are applied, and it may also be determined from the force-distance curve that the drop in force from the maximum holding capacity down to tear-off is smaller. It is also possible for the holding capacity and/or holding time being increased even if the suction lifter according to the invention is subject to a torsion load about its longitudinal axis (i.e. parallel to the direction in which the suction lifter is pressed against the fixing surface by the partial vacuum). Preferably, the means for preventing a lateral displacement provided on the suction disc and on the cup rim simultaneously provide for the centering of the suction cup with respect to the suction disc. This can apply to a condition without shearing load. Independently thereof, this can apply to a condition of the suction lifter in which it is subject to a vacuum or not.

Preferably, the suction disc is so designed that the cup rim projection has a minimum distance d1 from the fixing surface and that the suction disc has a material thickness d2 in the part of its radial outer rim which is greater than the distance d1. This prevents the outer rim of the suction disc from "slipping through" below the cup rim under the influence of shearing forces and provides for the rim of the suction disc being additionally clamped or wedged between the cup rim and the contact surface, thus increasing the holding time and the capability of receiving shearing forces. The material thickness d2 can be greater than the distance d1 by $\geq$5-10%, $\geq$20-30% or $\geq$40-50%.

Particularly preferably, the cup rim part of the suction cup includes a groove extending at least over a part of its circumference, and the suction disc is provided with a projection that engages with said groove and bears laterally against a flank of the groove of the cup rim, at least when the suction disc is under a partial vacuum or already when a parallel shearing force is applied to the suction disc which is not under a partial vacuum condition. Thus particularly effective means for preventing a displacement are provided, so that the suction lifter is capable of resisting considerably higher shearing forces, particularly shearing forces above 800-1,000 N, over a longer period of time while the size of the suction disc and/or the cup rim and the material of the suction disc are the same. It will be understood that when the shearing forces are very high, the projection may move out again from parts of the groove, but parts of the projection will in any case stay within the groove even under such conditions and provide for the suction disc being particularly effectively engaged with the cup rim. When no shearing forces are applied, the projection of the suction disc is preferably loosely supported within the groove, i.e. it is not adhered for instance to the cup rim. If necessary, the projection can be non-positively supported in the groove, though this is not always preferred.

In particular, the projection of the suction disc can engage with the groove already at a time where the suction disc is not under a partial vacuum. The suction disc can extend beyond the inner flank of the groove of the cup rim towards the longitudinal axis of the suction lifter and is preferably applied against the cup rim part which delimits the cup rim groove on the radially inner side, at least under a partial vacuum condition. The suction disc can extend in the main plane of the suction cup continuously over the entire hollow space between the suction disc and the fixing surface.

The projection of the suction disc engaging with the cup rim groove is preferably web-like. The projection of the suction disc can engage with the cup rim groove without undercuts. Preferably, the cup rim groove extends over the full circumference of the suction cup. Preferably, the projection of the suction disc extends over the full circumference of the suction disc.

In particular, the groove can have a cross section which is at least substantially rectangular, triangular or trapezoidal, without being limited thereto, and one groove flank (both groove flanks in the rectangular design) can extend perpendicular to the main plane of the suction cup. The cross section of the groove can be symmetrical or non-symmetrical with a groove center plane through the bottom of the groove. If at least one of the groove flanks is inclined, i.e. not vertical with respect to the main plane of the suction cup, it is preferably the inner groove flank that is more steeply inclined to the main plane of the suction cup than the radially outer groove flank. The angle between the groove flanks can be $\geq$30°-40° or $\geq$50°-60°. The angle between the groove flanks can be $\leq$70°-

80° or ≦60°. If the groove is not a rectangular groove, the same preferably expands towards the upper surface of the suction disc.

Preferably, the projection of the suction disc is supported at least over a part of or preferably over its entire radial width by the contact area of the suction disc on the fixing surface when the suction disc is at least approximately under the maximum partial vacuum condition and/or when the suction disc is not under a partial vacuum condition. This can apply to the suction lifter that is not subject to external forces (e.g. forces like shearing forces acting from outside and/or axial forces, except of the contact pressing force applied to the fixing surface by the partial vacuum). This can preferably also apply to the suction lifter that is subject to a shearing force, wherein the shearing force can amount to 50-75% of the maximum holding capacity under shearing load. The support of the projection of the suction disc under the above-mentioned conditions can independently amount to ≧25-40° or ≧50-75% of the radial width of the projection of the suction disc on its base on the upper side of the suction disc. Accordingly, with the suction lifter under no shearing load, at least the radially outer side of the projection of the suction disc is supported by the contact area of the suction disc on the fixing surface, at least when the suction disc is approximately under the maximum partial vacuum condition and/or when the suction disc is not under a partial vacuum condition.

Further, the suction disc and the cup rim can generally be so designed that the suction disc with the suction lifter under no vacuum condition is separated by a gap from the radially inner cup rim part at least over a part or all of its overall radial extension or is at least loosely applied against the same when no shearing forces are exerted on the suction lifter. This gap can merge into the interior of the hollow space. This cup rim part can be arranged radially inwards with respect to the flank of the cup rim groove or at the level of the radially inner flank of the cup rim groove or the radially outwardly directed lateral surface of the cup rim support projection that can be laterally applied against the support projection of the suction disc. The gap can extend up to the flank of the cup rim groove or up to the lateral surface of the cup rim groove projection. When the maximum vacuum is at least substantially applied by the operating mechanism and when no shearing force is exerted, the upper side of the suction disc may still be slightly spaced from the radially inner cup rim part or may be substantially loosely applied against the same while the radially inner cup rim part is preferably not yet subject to any contact pressing force with respect to the surface of the suction disc. When a shearing force is exerted, the radially inner cup rim part is preferably loosely applied against the surface of the suction disc or may still be slightly spaced from the same, but it is also possible that this part is applied against the surface of the suction disc by a significant contact pressing force, referring to the parts of the cup rim and the suction disc which are the front parts in the direction of the shearing force respectively. Here the inner cup rim part is directed to the surface of the suction disc or to the fixing surface respectively.

It is particularly advantageous for the cup rim and the suction disc and especially for the part of the suction disc opposite the cup rim being designed in such a way that when the suction disc is under a partial vacuum condition and especially when almost the maximum vacuum is applied to the suction disc, the suction disc sticks out at least a short distance from the fixing surface, at least over a part of the radial extension of the radially inner cup rim part. This preferably applies to the suction lifter which is not subject to external forces such as shearing forces for example. A gap is thus produced between the fixing surface and the suction disc and is preferably open towards the hollow space between the fixing surface and the suction disc. This gap can terminate approximately at the level of the lateral supporting flank of the cup rim projection or at the level of the radially inner groove flank or radially inwardly of the same respectively. Thus the contact pressing force of the suction disc to the fixing surface is limited to a part which is situated radially outwardly with respect to the radially inner flank of the cup rim groove or with respect to a nose extending in the circumferential direction of the suction cup and arranged radially inwards of the cup rim groove. This applies to the case in which the suction lifter is not subject to shearing forces. Accordingly, the suction disc can generally lift off from the fixing surface (only) over a part of its radial width, over which part the suction disc is supported on its upper side against the cup rim or loosely contacts the cup rim or is spaced from the cup rim by a small gap. The underside of the suction disc can generally lift off from the fixing surface by ≧5-10% or ≧15-20%, preferably ≦60-70% or ≦40-50% over the width of the cup rim. The radial width of the cup rim at the level of the suction disc can thus be greater than the contact area of the suction disc on the fixing surface. The full contact area of the suction disc on the fixing surface is thus reduced, so that the contact pressing force of the contact area of the suction disc to the fixing surface is increased. Thus the holding time of the suction lifter on the fixing surface can be increased all in all under shearing forces.

Preferably, the suction disc part arranged radially outwardly of the cup rim projection is designed as a "compression part" which accordingly is the radial part of the cup rim exerting the highest contact pressing force to the suction disc in the direction of the fixing surface, at least when substantially the maximum vacuum is applied. This cup rim part can be continuous around the full circumference of the suction lifter. This cup rim part can be situated radially outwardly of the lateral surface of the cup rim projection, which lateral surface can be applied laterally against the projection of the suction disc while impeding a lateral displacement of the suction disc and the suction cup. Thus a long holding time of the suction lifter can be achieved even under the influence of shearing forces.

The gap at the level of the radially inner flank of the cup rim groove between the suction disc and the fixing surface can have a height (i.e. a vertical spacing of suction disc and fixing surface) which, when the suction disc is applied against the radially inner cup rim part, amounts to ≧0.2-0.3 mm, preferably ≧0.4-0.5 mm, for example ≧0.6-0.7 mm. The gap can be ≦2.5-3 mm, preferably ≦2-2.25 mm, for example ≦1.5-1.75 mm. Lifting the part of the suction disc opposite the cup rim part off the fixing surface under vacuum conditions of the suction lifter can thus be facilitated or enabled by the radially inner cup rim part being vertically spaced from the surface of the suction disc when the suction lifter is not under a partial vacuum condition. That what has been mentioned above with regard to the height of the gap can also apply to the height of this latter-mentioned gap, except of a certain compression or deformation of the suction disc while the same is pressed against the cup rim. The gap at the level of the radially inner groove flank between the cup rim and the suction disc enables the contact surface of the suction disc on the fixing surface being limited to a part which is situated radially outwardly with respect to the radially inward groove flank of the cup rim groove. The contact pressing force of the suction lifter to the fixing surface under a given vacuum condition is thus increased.

The support projection of the cup rim is preferably so designed that it engages behind an undercut of the support projection of the suction disc. Thus the support projections engage with each other, which preferably applies already to the suction lifter which is not subject to shearing forces, so that curling of the suction disc rim under shearing forces is further impeded. The undercuts are provided on the radially inwardly or outwardly facing lateral surfaces of the respective support projections. Accordingly, the lateral surfaces of the support projections of the cup rim and/or the rim of the suction disc, and possibly also only the support projection of the cup rim and/or the rim of the suction disc, include an undercut on the lateral surface respectively facing the other one of the projections.

The projection of the suction disc and/or the support projection of the cup rim can extend at least over a part of the circumference of the suction disc, for example over $\geq 20\text{-}30°$, $\geq 40\text{-}60°$ or also $\geq 90\text{-}120°$ of the circumference of the suction disc.

The projection of the suction disc is preferably so arranged that the connecting line of the central part of the projection to the longitudinal axis of the suction lifter or to the central axis of the suction disc are arranged at least substantially parallel to the direction of the shearing force. Here the projection is preferably arranged on the side facing the longitudinal axis of the suction lifter in the direction of the shearing force. Preferably, two projections which are mutually oppositely arranged in the radial direction are provided on the suction disc in such a manner that the suction lifter is capable of receiving increased shearing forces in both directions, with the projection of the suction disc being supported and/or press-fitted in the groove of the cup rim. The projection of the suction disc preferably extends over the full circumference and continuously around the suction disc. It is possible for the projection being designed at least substantially in a web-like fashion. The groove of the cup rim can be so designed that the projection is guaranteed being seated under a non-partial vacuum and/or a partial vacuum condition of the suction disc. If necessary, even several, preferably web-like projections can be provided distributed over the circumference of the suction disc and engaging with a groove of the cup rim. Preferably, the circumferential projection of the suction disc is formed as a continuous projection.

The cup rim can be so designed that when the suction lifter is at least under a substantially maximum vacuum condition, it bears against the suction disc in such a manner that even if no shearing forces are exerted on the suction disc, zones of a different contact pressing force to the suction disc are produced in the radial direction of the cup rim, i.e. referred to a cross section of the cup rim. In particular, the contact pressing force can increase in the radial direction from inside to outside. The zone of a maximum contact pressing force can be arranged at the radially outer rim part of the cup, preferably in the central part or radially outwardly of the central axis of the same. Here the cup rim can increase from a radially outer part towards a radially inner part, so that its distance to a level fixing surface applied against the suction lifter becomes greater radially inwardly. The radially inner and the radially outer cup rim parts may be offset in height relative to each other by e.g. $\geq 0.2\text{-}0.5$ mm, $\geq 1\text{-}1.5$ mm or also $\geq 2\text{-}3$ mm. The height offset can be $\leq 5\text{-}7$ mm or $\leq 4$ mm. Thus the cup rim and/or the support part of the suction disc can be structured in such a manner that the same with the cup rim loosely applied against the suction disc form a common contact surface and a free space adjacent to the contact surface, the total contact surface of the cup rim against the suction disc being increased while the free space is decreased under the vacuum condition of the hollow space of the suction cup.

The outer rim part of the cup may include zones of a different angle of inclination relative to the main plane of the suction disc. A radially outer rim part of the cup may exhibit a smaller angle of inclination relative to the main plane of the suction disc than a rim part which is situated radially further inwards. Accordingly, the cup rim may include an angle of inclination of $\geq 0.2\text{-}0.35°$ or $\geq 0.5\text{-}0.75°$. The angle of inclination can amount to $\leq 6°$, $\leq 4\text{-}5°$ or $\leq 2\text{-}3°$, for example $1°$. Radially further inwardly, a cup rim part capable of being applied against the suction disc can be provided, which under the vacuum condition which at least substantially corresponds to the maximum vacuum condition includes an angle of inclination of $\geq 1°$, $\geq 2\text{-}3°$ or $\geq 5\text{-}8°$. The angle of inclination can amount to $\leq 20\text{-}25°$, preferably $\leq 15\text{-}17°$ or $\leq 12°$. These two parts having a different angle of inclination can be directly adjacent to each other or separated by a step. The part with the smaller angle of inclination relative to the fixing surface can extend up to the radial outer edge of the cup rim. It can also merge into a substantially plane part having a radial extension smaller than the radial extension of the inclined cup rim part. The cup rim can also be chamfered on its radial outer edge.

If the diameter of the suction cup is increased to such an extent that the cup rim substantially has the same outer diameter as the suction disc, the contact pressing force of the suction lifter to the fixing surface can be further increased. This is enabled by the suction disc rim being prevented from curling under shearing forces by the means provided according to the invention for preventing a relative displacement of the suction cup and the suction disc, e.g. a projection of the suction disc engaging with the groove of the suction rim, so that the curling of the suction disc needs not be compensated by a radial protrusion over the cup rim. Preferably, the radial protrusion of the cup rim and the outer rim of the suction disc against each other is $\leq 2.5$ to $3$ mm or $\leq 2\text{-}2.5$ mm, particularly preferably $\leq 1.5\text{-}1$ mm or $\leq 0.5$ mm up to practically 0 mm. Here the rim of the suction disc can outwardly protrude with respect to the cup rim or also vice versa.

Further, it turned out to be advantageous for various applications when the radially inner flank of the groove of the cup rim protrudes differently far in the direction towards the suction disc compared to the radially outer flank of the groove. For certain applications it can be beneficial for the radially inner flank of the groove protruding farther in the direction towards the suction disc than the radially outer flank of the groove. For other applications it can be beneficial for the radially outer flank of the groove protruding farther in the direction towards the suction disc than the radially inner flank of the groove. Thus it is possible to respectively adjust the contact pressing force of the cup rim to the suction disc and hence the radial distribution of forces of the contact area of the suction disc on the fixing surface under at least a nearly maximum vacuum condition and also to adjust the lateral support of the projection of the suction disc within the groove of the cup rim to the respective conditions such as for example the cup size, the suction disc material, static and/or dynamic shearing loads that are exerted, and the like. The difference of the vertical distances of the groove flanks (or their lower edges) to the fixing surface can be $\geq 5\text{-}10\%$ or $\geq 20\text{-}30\%$, referred to the smallest groove flank distance.

Preferably, the part of the cup rim adjacent to the radially inner flank of the groove is formed in such a manner that it is set back inwardly, i.e. away from the suction disc. This facilitates the suction disc being slightly lifted off from the fixing surface on the inner side of the cup rim.

With the suction disc in the non-partial vacuum condition, the projection of the suction disc engaging with the groove of the cup rim cannot be radially spaced from the radially outer side of the flank of the cup rim groove. Here the projection of the suction disc can bear against the inner groove flank or be slightly spaced from the same, especially less than the distance of the radially outer groove flank from the projection of the suction disc. This can respectively refer particularly to the medium height of the groove flank or to the groove flank part on the side of the bottom of the groove or on the side of the suction disc. This facilitates on the one hand the insertion of the suction disc into the groove of the cup rim, and on the other hand the shape assumed by the suction disc under the influence of shearing forces can be optimally defined.

The radially inner and the radially outer side of the supporting projection of the suction disc may generally have the same cross sectional contour and/or the same angle of inclination with respect to the longitudinal axis of the suction lifter. Both can at least be substantially perpendicular to the main plane of the suction disc for example. The projection of the suction disc may also have different flank geometries, especially different cross sectional contours and/or different angles of inclination with respect to the longitudinal axis of the suction lifter on its radially inner and radially outer sides, particularly when the projection of the suction disc engages with the groove of the cup rim. The radially inner side of the projection can be more steeply inclined with respect to the longitudinal axis of the suction lifter than the radially outer side of the projection. The radially inner side of the projection can include an angle with respect to the axis of 0-15°, preferably 1-10° or up to 6°, e.g. approx 2-4°. The radially outer flank angle of the projection with respect to the longitudinal axis of the suction lever can be 0-25°, preferably 1-20° or 2-15°, preferably 5-15°. The radially inner side and/or the radially outer side of the projection can be additionally chamfered.

The parts of the suction disc opposite to the radially inner and outer flanks of the cup rim groove in the longitudinal direction of the suction lever can include a height offset with respect to each other. The part of the suction disc opposite the radially inner groove flank can be offset in height with respect to a part of the suction disc opposite the radially outer groove flank. The part of the suction disc which is situated on the radially inner side with respect to the projection of the suction disc and may be laterally adjacent to the projection of the suction disc can include an annular recess upwardly inclining towards the center of the suction lever, if necessary. The thickness of the suction disc at the level of the recess can be relatively small compared to its thickness in the central part and/or on the outer rim, e.g. as small as 5-6 mm or 3-4 mm or even less. It can be smaller by $\leq$10-20% or $\leq$30-40% or less than the thickness of the suction disc at the level of its outer rim. This recess can receive the radially inner part of the cup rim. The recess can extend conically or inclined with respect to the main plane of the suction lifter and it can increase towards the central longitudinal axis of the suction lever. The recess can have a radial extension of $\geq$5-10 mm or $\geq$15-20 mm. The inclination of the surface of the suction disc in the part of the recess with respect to the main plane of the suction lifter, which extends parallel to the fixing surface with the suction lifter in the fixed position, can be $\geq$5-10°, $\geq$15-20° or $\geq$25-30°, preferably $\leq$30-45° or $\leq$60°. Since the suction disc is more flexible in the part of the channel-like recess than on the outer rim, this may lead to an undesired continued adherence of the suction disc part to the fixing surface when the suction lifter is released from the fixing surface or when the vacuum is relieved. To this end, the channel-like recess can be provided with local stiffeners which may be integrally molded to the suction disc. This prevents an excessive local adherence of the suction disc. All in all these parts can facilitate a ventilation of the hollow space and hence the release of the overall suction lifter. The stiffeners can be designed as webs or ribs which may preferably extend in the radial direction over the recess and which can be received at least partly by the cup rim, for example by a radially extending groove or a bay thereof which can be open towards the upper side of the suction disc. Provided that the stiffeners are suitably designed, they may also serve as an anti-rotation lock. The anti-rotation lock can be provided in addition. Further, the release of the suction disc from the fixing surface can be promoted by the projections on the underside of the suction disc in the part of the cup rim, these projections being compressed under a vacuum condition and exerting a restoring force on the rim of the suction disc upon relief of pressure on the suction lifter, said restoring force facilitating release of the rim of the suction disc in this part. These projections are preferably arranged somewhat radially inwardly with respect to the sealing area of the suction disc on the fixing surface.

Further, it is advantageous if a gap of $\geq$0.5-1 mm or $\geq$2-3 mm, if necessary $\leq$7-10 mm or $\leq$4-5 mm, is left between the upper side of the projection of the suction lifter and the bottom of the groove when the suction lifter is not under a partial vacuum condition or under a partial vacuum condition which substantially corresponds to the maximum partial vacuum condition. The suction disc is thus optimally pressed against the fixing surface and anchored within the groove of the cup rim even under shearing forces, since under shearing forces the projection can be tilted laterally radially outwardly and/or inwardly even inside the groove.

The height of the projection of the suction disc preventing a lateral displacement can be $\geq$0.5 mm, $\geq$1-2 mm or $\geq$3-4 mm. The height can be $\leq$8-10 mm or $\leq$4-6 mm, for example in the range of 2-6 mm.

The suction disc preferably further includes a lock against rotation relative to the suction cup, so that the suction disc and the suction cup are at least substantially locked against rotation relative to each other. This anti-rotation lock can be provided independently of the operating mechanism for producing the hollow space that is subject to a partial vacuum. As an anti-rotation lock one or more radially and/or axially projecting and/or set back parts can interact with corresponding parts of the suction cup, for example engage with corresponding seats of the suction cup. The anti-rotation projections can be arranged on the radially outer and/or radially inner side of the projection of the suction disc engaging with the groove of the cup rim. The projections serving as an anti-rotation lock are preferably molded to the projection of the suction disc which engages with the groove of the cup rim. To this end, the groove of the cup rim may have pocket-like recesses which are open towards the groove in the axial and/or radial directions. The anti-rotation projections can be preferably equally distributed over the entire circumference of the suction disc or can be arranged only in sections of the suction disc, especially in a section of the suction disc at the level of a center line or a central zone of the same traversing the center of the suction disc and being disposed substantially perpendicular with respect to the shearing direction. The suction disc rim of this zone is normally less subject to shearing and is thus capable of better supporting itself laterally.

In the suction lifter according to the invention the suction disc can be made from a relatively soft rubber material which is capable of perfectly snuggling up against the fixing surface. The rubber material can have a hardness of 20-75 Shore A, preferably a hardness of $\leq$65-70 Shore A or $\leq$55-60 Shore A.

The hardness can be ≧30-35 Shore A or ≦40-45 Shore A. Particularly preferably the hardness of the suction disc is approx 45-50 Shore A.

The suction disc can be supported on the suction cup by a holding element arranged in the central part of the suction disc. At the same time the holding element can be a part of the operating mechanism for producing a partial vacuum in the hollow space. The partial vacuum in the hollow space can normally be produced by spacing the central part of the suction disc from the fixing surface when the suction lifter is applied against the fixing surface. To this end, the central part of the suction disc can be coupled to a preferably manual operating mechanism for subjecting the hollow space to a vacuum. For this purpose an actuation pin can be provided which is coupled to a handle. The pin or the coupling element of the operating mechanism on the suction disc can be operated against a spring, so that the spring is loaded upon operation. The manual operating element can be designed as a rocker or knee lever.

BRIEF DESCRIPTION OF THE DRAWINGS

In the following the invention will be described by way of example with reference to the drawing figures. In the drawing figures it is shown by FIG. 1 a cross sectional view of a suction lifter with suction cup according to the invention.

DETAILED DESCRIPTION OF PREFERRED EMBODIMENTS

Figure 1:
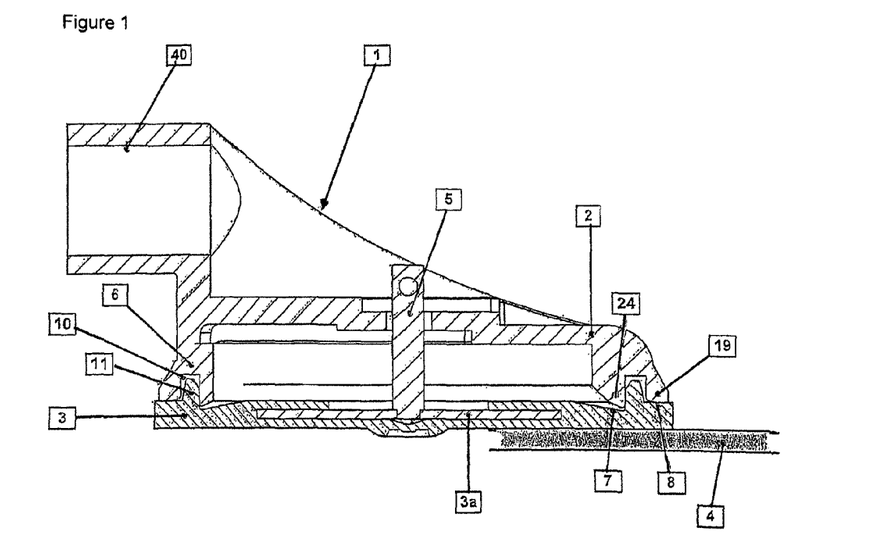

The suction lifter 1 according to FIG. 1 includes a suction cup 2 having a deformable suction disc 3. Between the suction disc and the indicated fixing surface 4 a partial vacuum can be produced for temporarily fixing the suction lifter on the fixing surface. To this end, the central part of the suction disc can be spaced from the fixing surface using the operating element 5, which in the present case is formed as a pin, when the suction lifter is applied against the fixing surface 4. This can be done by a manual operating element, e.g. a knee lever, engaging at the operating element 5. Upon changing the position of the operating element perpendicular to the suction disc, a spring (not shown) can be biased which may surround the pin in a helical fashion. The operating element can engage on a central engaging area 3a of the suction disc. In the present case the central engaging area is formed as a plate supporting the suction disc. The plate is vulcanized to the suction disc or is at least partly surrounded by the suction disc. The circumferential cup rim 6 of the suction cup which surrounds the hollow space that is under a vacuum condition may then be supported or press-fitted against the circumferential support parts 7, 8 of the suction disc.

According to the invention, the cup rim 6 includes a groove 10 which partly or preferably fully surrounds the cup rim 6. This groove is engaged by a projection 11 of the suction disc facing the cup rim. At least under a partial vacuum condition of the suction disc and under a shearing and/or torsion load about the longitudinal axis of the suction disc, the projection is laterally supported against a flank of 12 of the groove, especially against the radially inner flank of the groove. The support or press fit is preferably accomplished under the formation of a flat contact area of the projection against the groove. The projection 11 can be designed in such a manner that it already engages with the groove while the suction disc is not in a partial vacuum condition. The support projection of the suction disc can be applied against the support projection of the cup rim or the corresponding flank of the groove substantially over its entire height. By subjecting the hollow space to a vacuum, the projection of the suction disc can tilt laterally, especially laterally outwards. The projection can be arranged radially outwards of the reinforcement zone 3a of the suction disc. The projection, which may have a web-like configuration, can have a height of ≧1-2 mm. By the arrangement of this projection of the suction disc in the groove of the cup rim the suction lifter is capable at the same size of the suction disc of receiving higher shearing forces over a holding time which is as long as possible.

Under a vacuum condition which is at least substantially corresponds to the maximum vacuum condition, the part 13 of the cup rim arranged at the level of or at least directly adjacent to the radially inner flank 12 of the groove bears against the suction disc, so that the suction disc is supported by the cup rim on both sides of the groove.

The suction disc and the cup rim can be so designed that under a vacuum condition which at least substantially corresponds to the maximum vacuum condition, the suction disc at the level of the radially inner flank 12 of the groove of the cup ring lifts off at least slightly from the fixing surface for the suction lifter. According to the embodiment, lifting of this part 14 is enabled by a gap 18 being left between the protruding nose 15 of the cup rim adjacent to the radially inner flank 12 of the groove and the part 17 of the suction disc which is situated on the opposite side in the longitudinal direction of the suction lifter. It will be understood that the nose 15 may have the same circumferential extension as the groove 10 of the cup rim. When the suction lifter is under a vacuum condition and with the central part of the suction disc thus being lifted with respect to its rim part, the suction disc can be lifted at the level of the nose 15 by approximately the height of the gap, without mentioning elastic deformations of the suction disc. Thus the radial extension of the contact surface of the suction disc on the fixing surface or the intermediate space between the suction disc 3 and the fixing surface 4 are increased, whereby the contact pressing force of the suction lifter to the fixing surface can be correspondingly increased.

Figure 2:
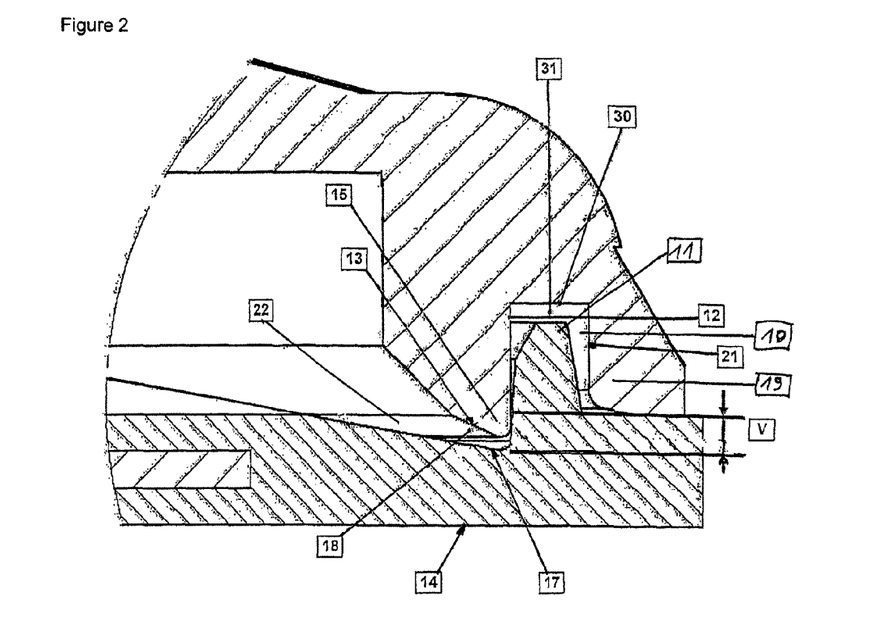
FIG. 2 a detailed view according to FIG. 1.

As illustrated in FIG. 2, the rim part of the cup rim providing the radially inner groove flank 12 can protrude farther towards the suction disc than the rim part 19 of the cup rim providing the radially outer groove flank. To this end, the part 20 of the suction disc which at this level opposes the inner groove flank can be vertically offset to the rear with respect to the radially outer frontal cup rim part 19, thus producing a height offset V. The suction disc can include a conically tapering part or a channel 22 that receives the radially inner cup rim part 24 that may include the nose 15, so that this part of the upper side of the suction disc will be applied against the inner cup rim part 24 under a partial vacuum condition. The channel or the conically tapering part may increase towards center of the suction disc under a minimum slope. Alternatively, according to FIG. 4, also the radially inner cup rim part having the inner groove flank 12 can be offset in its height to the rear with respect to the radially outer cup rim part. Here the suction disc can have the same height at the level of the two cup rim parts 19, 24 on both sides of the projection 11 of the suction disc, so that a gap is left between the inner cup rim part and the facing side of the suction disc, and the part 17 of the upper side of the suction disc can be applied against the inner cup rim part 24 under a vacuum condition of the suction lifter.

Due to the cup rim opposing the suction disc, curling and/or deformation of the suction disc are clearly impeded under shearing forces, so that higher shearing forces can be received. A further protrusion of the suction disc with respect to the suction cup is thus unnecessary. But it may be that the suction disc still slightly protrudes over the cup rim in order to serve as a lateral impact protection. According to the embodiment, the suction disc consisting of a rubber material has a hardness of approx 50 Shore A.

Figure 4:
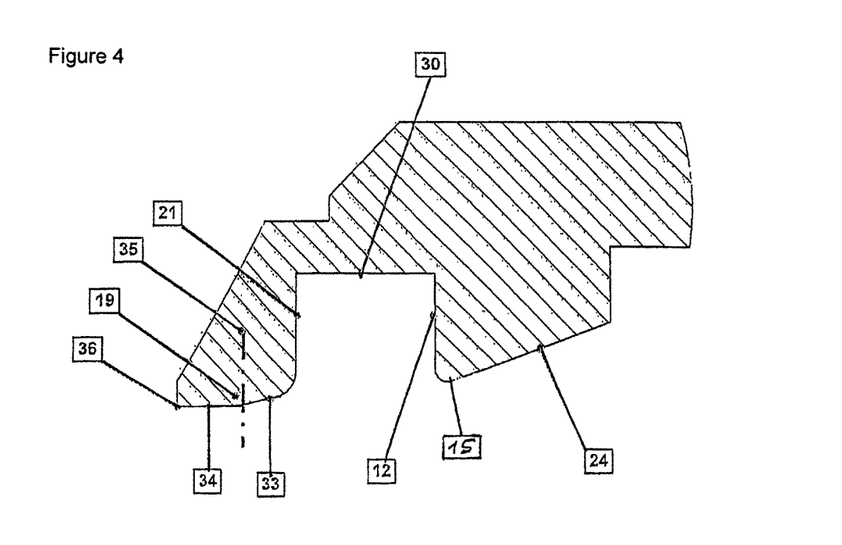
FIG. 4 a cross-sectional view of a cup ring of an alternative embodiment.

To allow the suction disc to snuggle up against the part of the cup rim situated radially inwards with respect to the groove, the cup rim part adjacent to the inner groove flank 12 is set back from the suction disc and is chamfered in the FIGS. 2 and 4. According to FIG. 2, different radial parts having a different inclination can be provided. The angle of inclination of the cup rim part 25 with respect to the main plane of the suction disc can increase towards the center of the suction disc. The angle of inclination of the cup rim part adjacent to the inner groove flank 12 can be 5-40°, e.g. approx 10-20°. The set-back part of the cup rim can have a nose-like cross section and can be directed towards the suction disc. It can be designed in an arc-shaped fashion.

Figure 5:
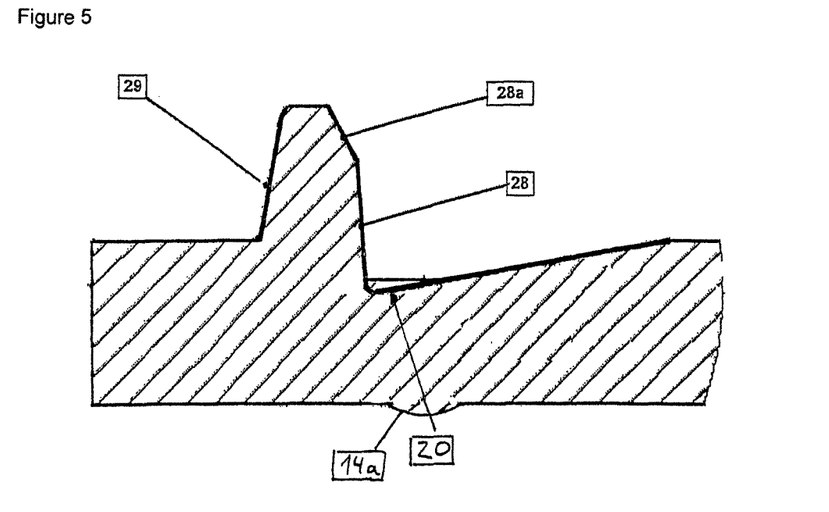
FIG. 5 a cross-sectional view of the part of the suction disc according to FIG. 2.

The projection of the suction disc engaging with the groove of the cup rim can have different geometries on the radially inner and radially outer sides 28, 29. The inner side 28 can be more steeply inclined with respect to the main plane of the suction disc than the outer side 29. The angles of inclination for the sides 28, 29 can amount for example to approx 1-10°, e.g. 2-6° (inside) or approx 2-20°, e.g. 5-15° or approx 10° (outside), see FIG. 5. The inner side of the projection can be additionally provided with a chamfer 28a which facilitates the insertion of the projection into the groove. In the loosely mounted condition, i.e. with no vacuum applied, the radial inner side of the projection can be spaced only slightly from the associated groove flank 12 or can at least bear against the same in the region of the base of the projection. The outer side 29 of the projection can be radially spaced from the outer groove flank 21. Thus the projection can be received in the groove under a minor compression. On the bottom 30 of the groove a certain gap 31 can be left with respect to the upper side of the projection, in order to compensate deformations of the suction disc when the suction disc is subject to shearing forces. This can generally apply. To facilitate release of the suction disc from the fixing surface, the underside of the suction disc is provided with a projection 14a which is arranged at the level of the gap 18 or is radially slightly offset inwards with respect to the gap and is compressed under a vacuum condition of the suction lifter.

Figure 3:
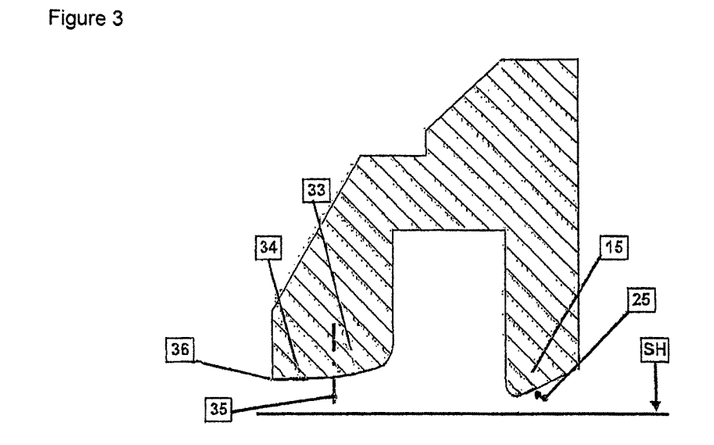
FIG. 3 a cross sectional view of a cup ring according to FIG. 2.

The cup rim is so designed that under a vacuum condition of the suction disc it exerts different contact pressing forces in the radial direction with respect to the suction disc, preferably pressing forces which increase radially outwardly, whereby the radial width of the contact surface of the suction disc on the fixing surface can be controlled. To this end, the cup rim and the suction disc are structured in such a manner that in the unloaded condition of the suction cup and with the suction cup being loosely placed on the suction disc, i.e. when no vacuum is applied, a gap is left between the cup rim and the upper side of the suction disc which preferably opens towards the inside of the cup or towards the groove. To this end, the cup rim can outwardly slope towards the suction disc, and/or the upper surface of the suction disc can slope radially inwardly at the level of the cup rim. The cup rim part arranged outwardly of the groove can have different radial parts with different angles of inclination. Preferably, the angle of inclination radially outwardly decreases towards the suction disc. Accordingly, the cup rim part 33 situated radially inwards with respect to the center line 35 for example can have an angle of inclination of approx 5-15°, e.g. approx 10°. The cup rim part 34 situated radially outwards with respect to the center line 35 can have an angle of inclination of approx 0.5-5°, e.g. approx 2°. The contact area of the cup rim with the cup loosely placed on the suction disc is thus positioned radially outwardly with respect to the center line 35 of the cup rim part that surrounds the cup rim groove on the outside (see FIG. 3). Here the contact area is practically formed by the outer edge 36 of the cup rim. The outer edge of the cup rim can also be chamfered, so that the supporting rim, which under the vacuum condition bears against the suction disc with the highest contact pressing force, is radially inwardly offset to some extent, but is preferably arranged still outside of the center line 35 of the outer cup rim part. When the suction lifter is subject to a shearing force, the suction cup is capable of lifting off from the suction disc on the side opposite to the direction of the shearing force.

Figure 6:
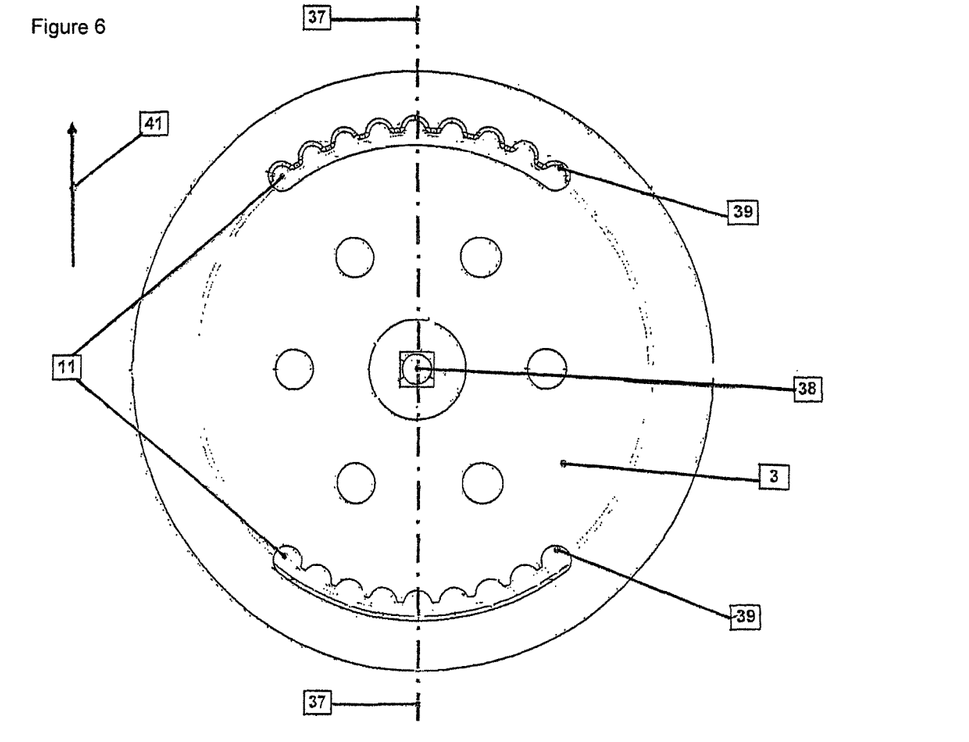
FIG. 6 a plan view of a suction disc of an alternative embodiment.

The suction disc can further include an anti-rotation lock, to which end the projection of the suction disc engaging with the cup rim groove is provided with laterally and/or axially protruding cams 39 adapted to engage with corresponding pocket-like recesses of the cup rim groove. These cams or holding protrusions can be arranged on the inside or on the outside of the projection 11 engaging with the groove. If necessary, the projections or cams can also be arranged on the suction disc directly adjacent to the projection of the suction disc. The cams may have a radial, arc-shaped, e.g. circular arc-shaped outside. If necessary, also projections of the suction cup can engage as an anti-rotation lock with recesses of the suction disc in or in the region of the cup rim groove, especially in recesses on the projection 11 engaging with the groove, wherein the recesses can be arranged on the upper side thereof. As illustrated in FIG. 6, it is thus possible for the projection 11 extending only over a part of the circumference of the suction disc, even if it is preferably formed over the full circumference. Here the projection 11 is arranged in such a way that the connecting line of the central part 37 of the projection to the center 38 of the suction disc is parallel to the shearing direction 41 of the suction disc or parallel to the pulling direction in the main plane of the suction disc. In particular, the projection is arranged on the side of the center of the suction disc facing the shearing direction, so that the suction lifter is supported in the shearing direction on the projection. To allow the use of the suction lifter in an arrangement rotated by 180°, i.e. with the shearing directions being mutually opposite, preferably at least two projections 11 are arranged oppositely to the center of the suction disc. With a suction lifter constructed in this way, the shearing direction should be predetermined by the holding device, e.g. a handle of the suction lifter, to thus avoid operating errors. This is practically automatically the case with a suction lifter having two suction cups connected for example by a handle 40 or in the case of a suction lifter with only one suction cup including a handle substantially fixed in its position with respect to the suction cup, since when operated in the usual way, for instance when carrying loads, forces are applied to the suction lifter transversely or perpendicular to the longitudinal direction of the handle.

Figure 7A:
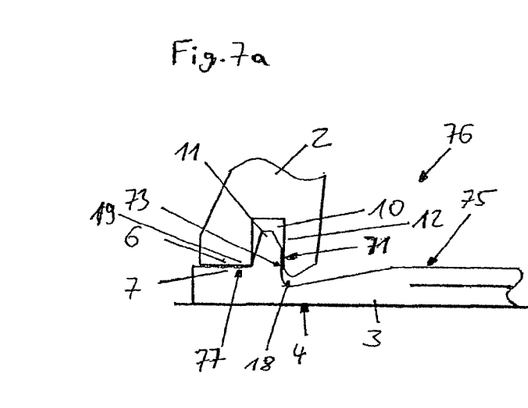
FIGS. 7a-7c Schematic illustrations of the suction lever according to FIG. 1 under different load conditions.

FIG. 7 schematically shows representations of a suction lifter according to FIG. 1 in three different conditions. In FIG. 7a, which mainly corresponds to FIG. 2, the suction lifter is in its non-loaded condition, i.e. it is neither subject to a vacuum nor to shearing forces. Here the lateral supporting surface 71 of the cup rim 6 is provided by the radially inner groove flank 12 and the supporting surface 73 of the rim of the suction disc is provided by the radially inner lateral surface of the projection 11 of the suction disc, while a lateral displacement of the suction cup 2 relative to the suction disc 3 under the influence of shearing forces is impeded by a cooperation of these two supporting surfaces. The part of the cup rim providing the lateral supporting surface of the cup rim, in the present case the radially inner part of the cup rim, is significantly spaced in height from the upper side 75 of the suction disc by a gap 18. This also applies to a part having the smallest distance to the upper side of the suction disc, which in the present case is provided by the nose 15 of the cup rim part. The gap 18 leads radially inwardly into a hollow space 76 between the suction cup and the suction disc, the gap expanding in a direction towards the hollow space. The suction cup is supported with its radially outer cup rim part 19 on the upper side of the suction disc. According to the embodiment, a two-dimensional contact area 77 is given here. The contact area can extend substantially parallel to the fixing surface.

Figure 7B:
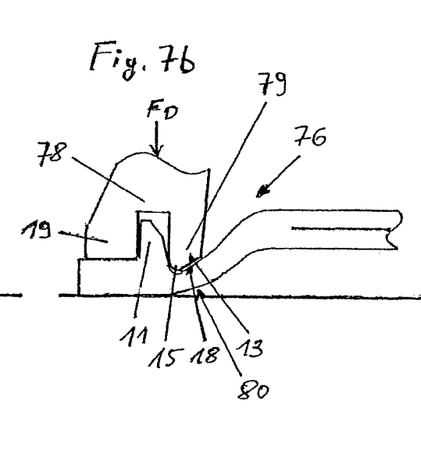

FIG. 7b shows the suction lever according to FIG. 7a under a vacuum condition which is at least substantially the maximum vacuum condition, whereby the suction lifter is pressed by the pressure force $F_D$ against the fixing surface. The radially outer cup rim part 19 is supported on the upper side of the suction disc, whereby pressure is exerted on this part of the suction disc (and preferably substantially only on this part of the suction disc). At the same time this provides for a large effective contact radius of the suction disc with the cup rim, whereby the moment of resistance against shearing can be increased. Thus the radial width Ba of the contact area 77 is clearly smaller than the width Bf of the base 78 of the cup rim (see FIG. 7c), thus producing a high contact pressing force on the outer cup rim against the fixing surface 4 and thus a high sealing effect in this part against a vacuum loss of the hollow space. A rest of the gap 18 may be left between the radially inner cup rim part 13 and the opposing part of the suction disc, or the suction disc can be loosely applied against the cup rim part without a considerable force being exerted or, if necessary, with only a small force being exerted. The support projection 79 of the cup rim can be supported with its radially outer lateral surface, which corresponds to the supporting surface 71, against the projection of the suction disc at least over a part of its height, especially in the region of its base 78, in the shearing direction. The suction disc can lift off from the fixing surface below the radially inner cup rim part 13 while forming a gap 80. The suction disc contacts the fixing surface over the radial extension of the outer cup rim part and over a part or substantially the entire width of the projection of the suction disc or possibly also radially further inwards.

Figure 7C:
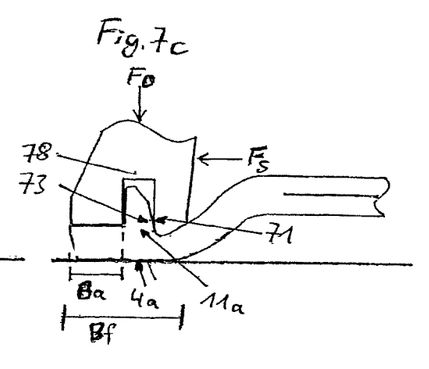

Under a vacuum condition and under an additional shearing load due to shearing forces $F_S$ according to FIG. 7c, the contact area of the support projection 79 of the cup rim and of the support projection 11 of the suction disc produced by the supporting surfaces 71, 73 can be increased. The suction disc 3 is pressed against the fixing surface 4 by the radially outer part 19 (for example only by this part) of the cup rim. The suction disc is pressed against the fixing surface over the radial width of the radially outer cup rim part 19 and at least substantially the width of the projection 11 of the suction disc. A rest of the gap 18 can continue to exist between the radially inner cup rim and the suction disc, or the suction disc can be substantially loosely applied against the cup rim portion or with only a small contact pressing force. All in all, under a condition which is at least almost the maximum vacuum condition, cup rim zones with a different contact pressing force against the suction disc can thus be produced, even when no shearing forces are exerted on the suction disc, for example by a reduction of the gap under a vacuum condition.

By the supporting surfaces 71 of the cup rim part or the cup rim projection 13 on the supporting surface 73 of the projection of the suction disc, the suction disc is additionally pressed against the fixing surface 4 upon the influence of shearing forces, whereby the shearing forces are transferred. By the transmission of the pressure force, the part of the suction disc which is arranged upstream of the supporting surfaces 71, 73 (i.e. their zone of interaction) in the direction of the shearing forces and which is arranged radially further outwards with respect to the supporting surfaces, is additionally pressed against the part 4a of the fixing surface. Further, the coupling position of the means preventing a lateral displacement provided on the suction disc, here the base 11a of the projection 11 of the suction disc, is arranged radially further outwards than the coupling position of the means preventing a lateral displacement provided on the suction cup and the suction disc, namely the supporting surfaces 71, 73.

Figure 8:
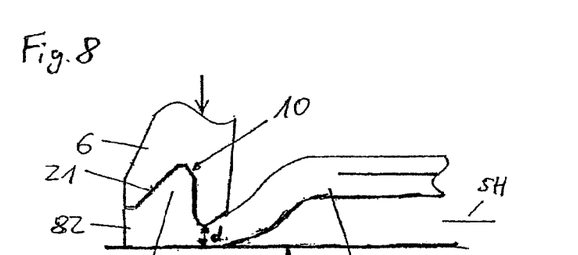
FIGS. 8, 9 schematic illustrations of suction lifters of further alternative embodiments.

FIG. 8 shows a modification of a suction lifter according to FIG. 7 under a vacuum condition, and that what has been explained above can also apply to this modification. Differently from the above-described embodiment, the modification provides for the cup rim groove 10 expanding towards the suction disc. The cup rim groove 10 and the suction disc projection 11 are substantially triangular. Independently thereof, the suction disc projection 11 almost completely fills the cup rim groove. This can also generally apply. The lateral supporting surfaces 71, 73 of the cup rim and the suction disc projection are arranged substantially perpendicular with respect to the main plane of the suction disc or to the fixing surface. The two supporting surfaces 71, 73 are normally more steeply inclined with respect to the main plane SH of the suction disc (illustrated for the non-vacuum condition) than the radially outer flank 21 of the cup rim groove which may for instance include an angle of 30°-60°, e.g. approx 45° with respect to the main plane SH of the suction disc. Under a vacuum condition which is at least almost the maximum vacuum condition, the projection 11 of the suction disc is pressed against the fixing surface 4 by the cup rim 6 in the region of the radially outer groove flank 21. The radially outer part 82 of the suction disc, which is arranged radially outside with respect to the groove 10 (or generally radially outside with respect to the supporting surface of the cup rim and the suction disc), has a greater height than the gap or distance d between the inner groove flank or the inner groove flank part and the fixing surface. Incidentally, reference is made to the full content of the explanations regarding FIG. 7.

Figure 9:
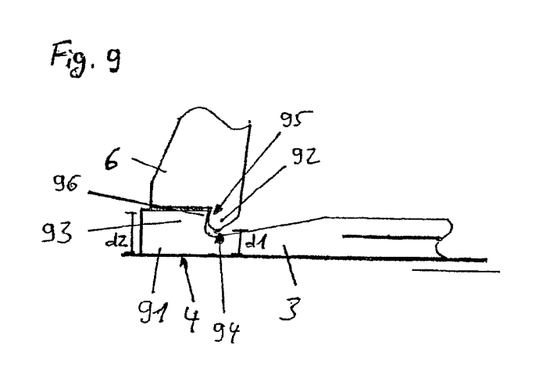

FIG. 9 shows a further modification. In this illustration the suction disc is not under a vacuum condition. The cup rim 6 and the rim 91 of the suction disc include projections 92, 93 which engage one behind the other and which are supported against each other in the direction of the shearing forces when shearing forces are applied. The support projection 92 of the cup rim is arranged radially inwards with respect to the support projection 93 of the suction disc. Also in this case a gap 94 is provided between the part of the cup rim providing the cup rim projection and the upper side of the suction disc. This gap can continue to exist at least partially even after a vacuum pressure has been applied, or the suction disc and the cup rim part can bear against each other loosely or with only little force exerted thereon in the region of this gap. The support projection 92 of the cup rim is spaced by a minimum distance d1 from the fixing surface. The distance d1 is less than the material thickness d2 or the height of the suction disc in the region of its outer rim. The radial inner side of the projection of the suction disc and the outer side of the cup rim projection are provided with undercuts 95, 96 with respect to the vertical direction, so that the same additionally mesh with each other. The mutually abutting surfaces of the cup rim and the upper surface of the suction disc here extend horizontally, but this is not required. Both surfaces can slope for example also radially outwardly towards the fixing surface.

LIST OF REFERENCE NUMBERS

- 1 suction lifter
- 2 suction cup
- 3 suction disc
- 3a engaging area
- 4 fixing surface
- 5 operating element
- 6 cup rim
- 7, 8 supporting area
- 10 groove
- 11 projection
- 11a base
- 12 groove flank
- 13 cup rim part
- 14,14a suction disc part
- 15 nose
- 17 suction disc part
- 18 gap
- 19 cup rim part
- 20 suction disc part
- 21 groove flank
- 22 channel
- 24, 25 cup rim part
- 28, 29 projection sides
- 28a chamfer
- 30 bottom of the groove
- 31 gap
- 33, 34 cup rim part
- 35 center line
- 36 outer edge
- 37 central part of the projection
- 38 center of the suction disc
- 39 cam
- 40 handle
- 71, 73 supporting surface
- 75 upper side of the suction disc
- 76 hollow space
- 77 contact area
- 78 base
- 79 cup rim support projection
- 80 gap
- 82 suction disc part
- 91 suction disc rim
- 92, 93 support projection
- 94 gap
- 95, 96 undercuts

The invention claimed is:

1. A suction lifter intended for the temporary fixing on a substantially smooth, air-impermeable fixing surface, said suction lifter comprising a suction cup, a deformable suction disc to be placed against the fixing surface, said suction disc being a separate part from said suction cup, and means for spacing a central part of the suction disc from the fixing surface for forming a hollow space under a partial vacuum condition between a suction side of the suction disc and the fixing surface, wherein the suction disc is arranged between the suction cup and the fixing surface, wherein the suction cup further has a circumferential cup rim surrounding the hollow space, and wherein a circumferential supporting rim of a non-suction side of the suction disc facing the cup rim is supported against the cup rim under a vacuum condition, wherein said suction cup rim has a circumferential support projection extending in an axial direction towards said suction disc and engaging the non-suction side of the suction disc rim when under at least a partial vacuum condition and the suction disc rim having a circumferential support projection on the non-suction side extending substantially in an axial direction, which cup and disc projections engage one behind the other and which are supported against each other in the radial direction when a shearing force is exerted, and wherein the cup rim is configured such that different portions of the cup rim engage the non-suction side of the suction disc radially inward and outward from the suction disc projection when a vacuum is applied, and wherein the radially outward portion of the cup rim has a greater contact area than the radially inner portion of the cup rim.

2. A suction lifter according to claim 1, wherein the support projection of the cup rim is arranged radially inwardly with respect to the support projection of the suction disc.

3. A suction lifter according to claim 1, wherein the support projection of the cup rim is spaced from the fixing surface by a minimum distance d1 and that the suction disc has a material thickness d2 in the region of its radial outer rim which is greater than the distance d1.

4. A suction lifter according to claim 1, wherein the suction disc and the cup rim are so designed so that when the suction disc is subject to almost the maximum vacuum it lifts off from the fixing surface over a part of its radial width, at the cup rim support projection.

5. A suction lifter according to claim 1 wherein when the suction disc is subject to a partial vacuum and/or to a non-partial vacuum the projection of the suction disc is supported over a part or over its entire radial width by the portion of the suction disc at the disc projection being on the fixing surface.

6. A suction lifter according to claim 1 wherein the cup rim includes a groove extending at least over part of the circumference of the cup rim and the suction disc projection engages with the cup rim groove under a partial vacuum condition of the suction disc and is laterally supported against a flank of the groove when a shearing force is exerted on the suction cup.

7. A suction lifter according to claim 1, wherein the support projection of the cup rim engages behind an undercut of the support projection of the suction disc.

8. A suction lifter according to claim 1, wherein the outer diameter of the cup rim substantially corresponds to the outer diameter of the suction disc.

9. A suction lifter according to claim 1, wherein a radially outer part of the cup rim, and an opposite supporting area of the suction disc are structured in such a way that under a partial vacuum condition of the suction disc zones of a different contact pressing force of the cup rim with respect to the suction disc are produced over the radial extension of the cup rim.

10. A suction lifter according to claim 1, wherein the support projection of the cup rim is set back radially inwardly with respect to the supporting surface for the projection of the suction disc from the suction disc towards the center of the suction lifter.

11. A suction lifter according to claim 1, wherein the support projection of the suction disc has different flank geometries on the radially inner and radially outer sides.

12. A suction lifter according to claim 1, wherein the suction cup rim includes a circumferential groove having a radially outer groove flank and, when under a non-partial vacuum condition of the suction disc, the suction disc projection is radially spaced from the radially outer groove flank.

13. A suction lifter according to claim 12, wherein the cup rim groove has a radially inner groove flank and the part of the suction disc arranged opposite to the radially inner groove flank has a different height than the part of the suction disc arranged opposite to the radially outer groove flank.

14. A suction lifter according to claim 1, wherein the suction disc includes an anti-rotation lock relative to the suction cup, independently of the device for producing a hollow space which is subject to a partial vacuum.

15. A suction lifter according to claim 14, wherein the anti-rotation lock is designed as at least one or more radially and/or axially protruding parts of the support projection of the suction disc, which protrusions engage with one or more seats of the cup rim in a fashion preventing rotation.

16. A suction lifter intended for the temporary fixing on a substantially smooth, air-impermeable fixing surface, said suction lifter comprising
a substantially non-deformable suction cup having a circumferential cup rim surrounding a hollow space, said rim having, a circumferential groove with a radially inter flank and a radially outer flank, and said cup rim having a support projection radially inward from the groove;
a deformable suction disc supported on said cup, said disc having a projection on a side of said disc facing said cup rim, the disc projection being loosely received in said cup rim groove and engages the inner groove flank when the suction lifter is in a non vacuum condition, and
an operating element engaged with a central area of said suction disc adapted to lift a central area of said disc into the hollow space of said cup and thereby form a partial vacuum in a hollow space between said suction disc and the fixing surface, and when under a partial vacuum condition said suction disc being drawn into engagement with said cup support projection,
wherein the cup rim support projection is axially spaced from the suction disc when the suction lifter is in a non-vacuum condition such that an axial gap is formed between the cup projection and the suction disc.

17. A suction lifter according to claim 16, wherein the suction disc projection is adapted to tilt outwardly to engage the outer groove flank of said cup rim when under partial vacuum condition.

18. A suction lifter intended for the temporary fixing on a substantially smooth, air-impermeable fixing surface, said suction lifter comprising
a substantially non-deformable suction cup having a circumferential cup rim surrounding a hollow space, said rim having a circumferential groove with a radially inner flank and a radially outer flank, said rim having an axially extending support projection and an outer cup rim part radially outward from the support projection;
a deformable suction disc supported on said cup, said disc having a projection on a side of said disc facing said cup rim, the disc projection being laterally adjacent the cup support projection; and
an operating element engaged with a central area of said suction disc adapted to lift a central area of said disc into the hollow space of said cup and thereby form a partial vacuum in a hollow space between said suction disc and the fixing surface;
wherein a portion of the suction disc axially opposite the outer cup rim part is thicker than a portion of the suction disc axially opposite the cup support projection; and
wherein the radially inner flank of the groove of the cup rim protrudes farther in the axial direction towards the suction disk than the radially outer flank.

19. A suction lifter according to claim 18, wherein the cup rim and suction disc are configured such that the cup rim comprises different portions engaging the non-suction side of the suction disc with different pressing forces and that a portion of the cup rim exerting the highest contact pressing force against the suction disc is radially outward of the cup projection at least when a substantially maximum vacuum is applied.

20. A suction lifter intended for the temporary fixing on a substantially smooth, air-impermeable fixing surface, said suction lifter comprising
a substantially non-deformable suction cup having a circumferential cup rim surrounding a hollow space, said rim having an axially extending support projection and an outer cup rim part radially outward from the support projection;
a deformable suction disc supported on said cup, said disc having a radially outward portion axially opposite the outer cup rim part that is thicker than a portion of the suction disc axially opposite the cup support projection; and
an operating element engaged with a central area of said suction disc adapted to lift a central area of said disc into the hollow space of said cup and thereby form a partial vacuum in a hollow space between said suction disc and the fixing surface.

21. A suction lifter intended for the temporary fixing on a substantially smooth, air-impermeable fixing surface, said suction lifter comprising
a substantially non-deformable suction cup having a circumferential cup rim surrounding a hollow space, said cup rim having a support projection;
a deformable suction disc supported on said cup, said disc having a projection on a side of said disc facing said cup rim, the disc projection being radially outward to the cup projection, the cup projection and the disc projection being laterally supported against each other in the radial direction when shearing forces are exerted laterally to the suction lifter with respect to the fixing surface, and
an operating element engaged with a central area of said suction disc adapted to lift a central area of said disc into the hollow space of said cup and thereby form a partial vacuum in a hollow space between said suction disc and the fixing surface, and when under a partial vacuum condition, said suction disc being drawn into engagement with said cup support projection, and
wherein the cup rim support projection is axially spaced from the suction disc when the suction lifter is in a non-vacuum condition such that an axial gap is formed between the cup projection and the suction disc.

* * * * *

UNITED STATES PATENT AND TRADEMARK OFFICE
CERTIFICATE OF CORRECTION

PATENT NO.        : 8,500,181 B2
APPLICATION NO.   : 12/554073
DATED             : August 6, 2013
INVENTOR(S)       : Ostendarp It is certified that error appears in the above-identified patent and that said Letters Patent is hereby corrected as shown below:

In the Claims:

In Column 19, Line 28 of the issued patent, after "having" please delete ",".

In Column 19, Line 28 of the issued patent, after "radially" please delete "inter" and replace with --inner--.

Signed and Sealed this
Sixteenth Day of December, 2014

Michelle K. Lee
*Deputy Director of the United States Patent and Trademark Office*